June 12, 1956 G. P. GREENAMYER 2,750,116
UNIVERSAL SAFETY TEMPERATURE CONTROL UNIT
Filed Nov. 4, 1950 3 Sheets-Sheet 1
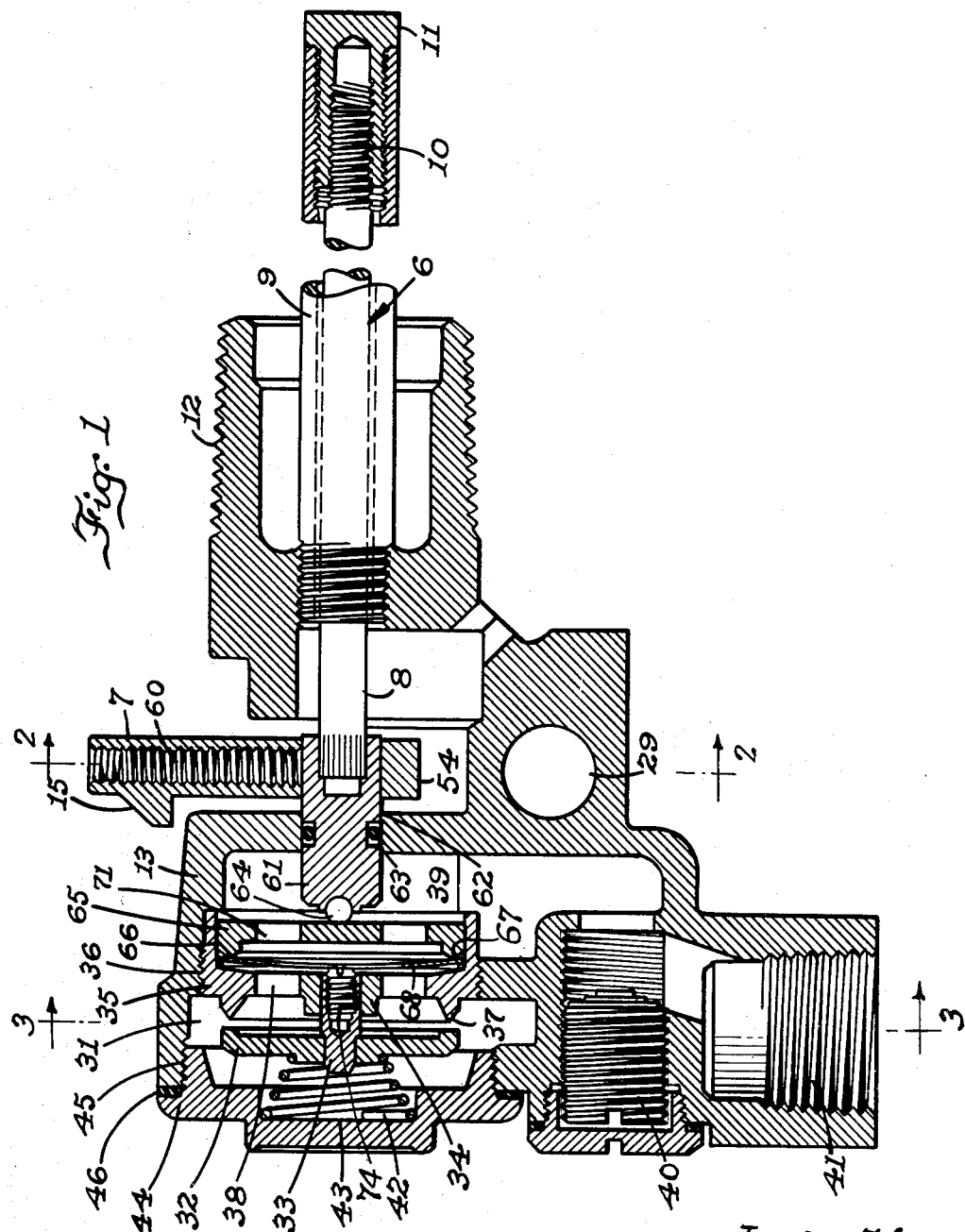
Inventor
George P. Greenamyer June 12, 1956   G. P. GREENAMYER   2,750,116
UNIVERSAL SAFETY TEMPERATURE CONTROL UNIT
Filed Nov. 4, 1950   3 Sheets-Sheet 2
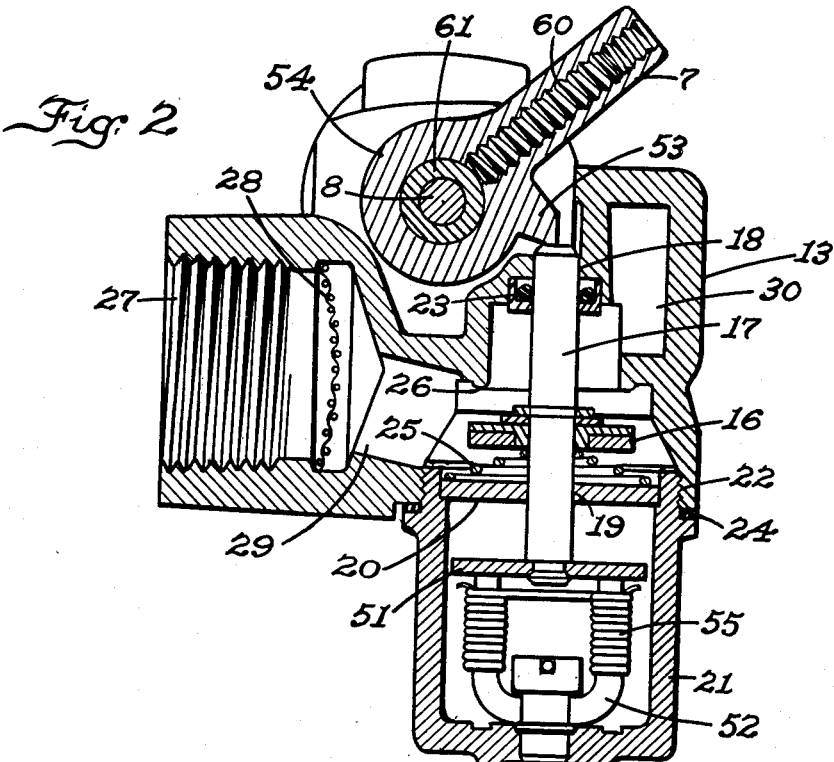
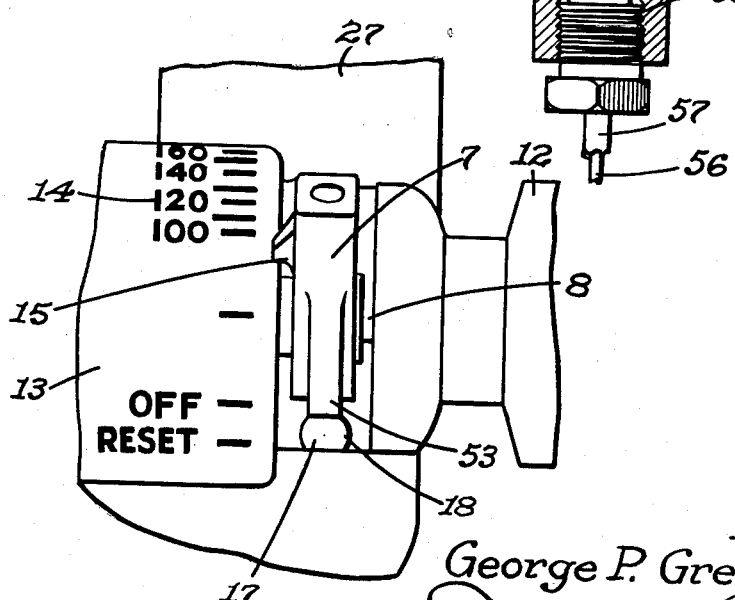
Inventor
George P. Greenamyer

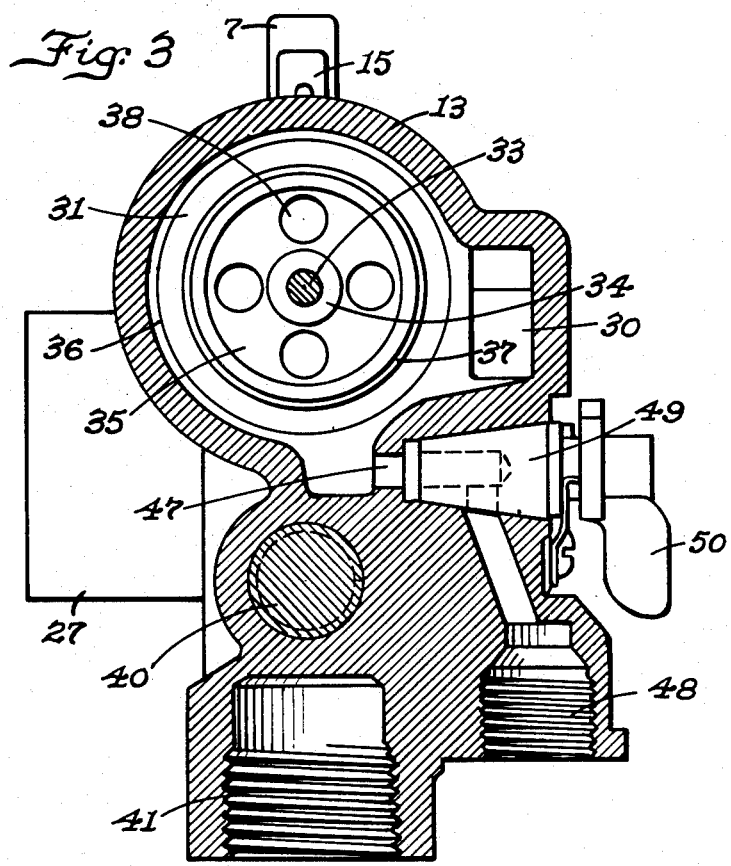
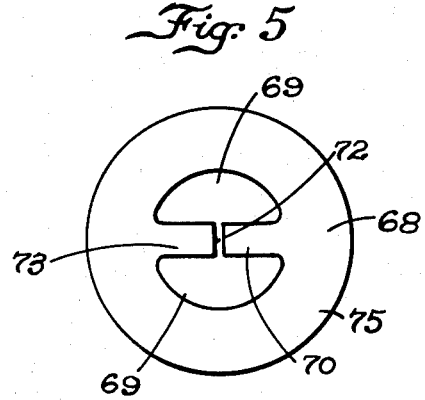

United States Patent Office 2,750,116
Patented June 12, 1956

2,750,116

UNIVERSAL SAFETY TEMPERATURE CONTROL UNIT

George P. Greenamyer, Monrovia, Calif., assignor to General Controls Co., Glendale, Calif., a corporation of California Application November 4, 1950, Serial No. 194,111

4 Claims. (Cl. 236—21)

This invention relates to a universal safety temperature control unit for automatic storage type water heaters and other gas burning heating appliances, and is more particularly concerned with the provision in a unitary device of a thermostatically controlled valve and a thermomagnetic safety pilot valve.

The principal object of my invention is to provide a thermostatically controlled valve in which the temperature setting lever, that is arranged to be oscillated between the "Hot" and "Cold" extremes in the conventional manner and be set at a selected position according to the temperature desired, is also arranged to set the safety pilot valve, thereby dispensing with the necessity for a separate push-button for resetting purposes, and accordingly simplifying operation for the user and improving the construction generally.

The invention is illustrated in the accompanying drawings, in which—

Fig. 1 is a longitudinal section through a universal safety temperature control unit made in accordance with my invention;

Fig. 2 is a cross-section on the line 2—2 of Fig. 1, but showing the temperature setting lever in the reset position, namely, beyond the low temperature extreme position, holding the safety valve open;

Fig. 3 is a cross-section on the line 3—3 of Fig. 1, showing the pilot shut-off cock, Fig. 4 is a top view of a portion of Fig. 1, showing the graduations on the body of the valve relative to which the pointer on the temperature setting lever is arranged to move, and Fig. 5 is a face view of the snap action disk provided in connection with the thermostatically controlled valve.

The same reference numerals are applied to corresponding parts in these five views.

Referring to the drawings, the thermostatic control valve forming a part of the present unit is similar to those forming the subject matter of Grayson Patents 1,699,468, 1,744,465, and 1,781,328, and comprises a thermostat 6 of the rod and tube type, in connection with which the temperature setting lever 7 is provided fixed to one end portion of the rod 8 to turn it relative to the tube 9 and, accordingly, adjust the threaded end portion 10 of the rod in the plug 11 provided in the outer end portion of the tube 9. The tube 9 is of brass or copper and expands and contracts appreciably with temperature change, whereas the rod 8 is of invar, or some other suitable non-expanding material or one having a low coefficient of expansion. The tube 9 is threaded, or otherwise suitably fixed, in a plug 12 that is adapted to be threaded into a bushing or spud in the side wall of the tank of a gas operated water heater, for example. The valve body 13, which is suitably cast integral with the plug 12, has temperature graduations 14 provided on a cylindrical portion thereof, and the temperature setting lever 7 has a pointer 15 thereon arranged to move realtive to these temperature graduations, as shown in Fig. 4. These graduations include at the low temperature end the readings "Off" and "Reset," the former being equivalent to a zero mark and the latter being spaced beyond that point to indicate to the operator how much farther the lever 7 should be moved to set or reset the safety valve 16 in open position. The safety valve 16, as clearly appears in Fig. 2, is provided on a rod or stem 17 reciprocable in guides 18 and 19, guide 18 being a hole in the wall of bdy 13, whereas guide 19 is in a plate 20 that has a press fit in a counterbore in the mouth of a cup 21 that is threaded in an oupening 22 provided in the body 13. A gas seal 23, which includes an O-ring for a more effective sealing action, is provided, having a press fit in a counterbore adjacent the hole 18. A gasket 24 prevents leakage at the threaded connection 22. The plate 20 serves also as an abutment for the large end of a conical compression spring 25, whose small end encircles the rod 17 under valve 16. This spring normally tends to close the valve 16 on its seat 26, whereby to shut off the flow of gas from the line to both the pilot burner and main burner of the storage type water heater or other gas burning heating appliance in connection with which my control unit is used, the gas inlet connection being shown at 27, suitably screened, as indicated at 28, and communicating through a passage 29 with the safety valve. Passage 30 cored in the body 13 leads from the safety valve to the valve chamber 31, in which the thermostatically controlled valve 32 is provided, arranged to be opened and closed with snap-action in response to a predetermined temperature change of the thermostat 6, whereby to control the operation of the main burner and, accordingly, maintain a selected temperature for which the thermostat 6 was set by means of lever 7. Valve 32 is guided by means of a stem 33 working in a central guide 34 provided in a bushing 35 threaded in a bore 36 opening off valve chamber 31, this bushing having a valve seat 37 thereon for cooperation with valve 32, and having a series of holes 38 therein through which, when the valve 32 is unseated, gas is free to flow into chamber 39 and, thence, past an adjustable restriction valve 40 and out through outlet 41 to the main burner. A conical compression spring 42 cooperates with valve 32 to hold it normally seated, and this spring is seated in a depression 43 provided therefor in a closure cap 44 threaded in an opening 45 provided in the wall of the body 13 at chamber 31. A gasket 46 prevents gas leakage at this cap. Independently of the opening and closing of valve 32, however, gas is always supplied to the pilot burner from chamber 31 so long as the safety valve 16 remains open, there being a passage 47 in the body 13 communicating with the valve chamber 31, as disclosed in Fig. 3, through which gas is conducted through the outlet 48 to the pilot burner, so long as the pilot cock 49 controlling the flow of gas through passage 47 is left in an open position. The size of the pilot flame may also be regulated by adjusting this cock 49 by means of its handle 50.

The armature 51 is carried on the inner end of the rod 17 in a fixed coaxially spaced relationship to the safety valve 16 and is arranged to be held by a horseshoe magnet 52 in the position shown in Fig. 2, holding the safety valve 16 open against the resistance of its closing spring 25, but only so long as the magnet 52 remains energized by current generated by the heat of the flame of the pilot burner after the pilot burner is lighted. A radial projection 53, provided on the hub end 54 of the temperature setting lever 7, is disposed over the outer end of the rod 17 when the lever 7 is in the vicinity of the "Off" reading, and, assuming the safety valve 16 is closed at the time, it can be opened against the resistance of spring 25 by moving the lever 7 to the extreme position marked "Reset." The operator moves the lever 7 as far as it will go, that being when the armature 51 comes into engagement with magnet 52. Hence, once the operator has become acquainted with the device, he does not have to be able to read the markings adjacent the graduations, and, of course, that is important, because water heaters are frequently installed in dark corners of basements. The operator then lights the pilot burner and, while he is doing that, he does not have to be concerned about holding the lever 7 in the "Reset" position, because there is enough friction in the threaded connection at 10 to eliminate likelihood of the lever 7 being moved back under the pressure of the return spring 25. The thermoelectric generator is not shown but only the energizing coil 55 associated therewith and encircling the two prongs of the horseshoe magnet 52, the end portion of the insulated lead wire extending from the generator being indicated at 56 sheathed in a lead tube 57 attached, as indicated at 58, to the neck 59 of the cup 21, the wire 56 being electrically connected with the insulated end of the coil 55, and the other end of the coil being grounded. When the horseshoe magnet 52 has been energized sufficiently to hold the armature 51 against the action of return spring 25, so as to insure keeping the safety valve 16 open, the lever 7 can be moved away from rod 17 to set the thermostat 6 for a selected temperature, and, obviously, so long as the lever 7 remains in the "Off" or "Reset" position, valve 32 will remain closed, so that there is no likelihood of any gas being delivered to the main burner until after the pilot burner has been lighted, and, consequently, there is no danger of an explosion, provided only that the operator lights the pilot burner promptly after he has moved the lever 7 to the extreme right to open the safety valve, which, of course, allows discharge of gas to the pilot burner.

The pointer 15 on lever 7 will, of course, indicate reasonably accurately the temperature on the scale 14, assuming the lever 7 has been set properly in relation to the rod 8 of thermostat 6 at the factory, the lever 7 having a screw 60 therein for locking the same in a fixed relationship to a plunger 61 that is fixed on the end of the rod 8 of the thermostat and is slidable in a hole 62 in the back wall of the body 13 for cooperation with the snap-action mechanism for operating the valve 32. An O-ring provided in an annular groove 63 in the plunger 61, prevents gas leakage through hole 62. A hardened steel ball 64, set in a recess in the inner end of plunger 61, provides an antifriction bearing for the plunger 61 on the center of a larger cylindrical push-member 65 that is guided for a small amount of reciprocatory movement in a bore 66 provided in the bushing 35. A circular knife edge 67 is provided on the inwardly projecting rim of the push-member 65 for engagement with the back of a convexo-concave snap-action spring disk 68 near the outer periphery thereof, so that the disk, which is supported at its outer peripheral edge in the bushing 35 at the inner end of the bore 66, is caused to snap over center to open the valve 32 upon a predetermined movement of the push-member 65 in response to a predetermined temperature change of thermostat 6, similarly as in Grayson Patent No. 1,699,-468. However, in the present construction, the disk 68 is cut away, as at 69, on opposite sides of a diametrically extending web portion 70, as illustrated in Fig. 5, so as to permit gas flow through the disk when the valve 32 is opened, and accordingly permit disposition of the disk right next to the valve instead of at some appreciable distance from it, similarly as in Grayson Patent No. 1,941,-795, for greater compactness and economy in construction. The push-member 65 has a series of apertures 71 provided therein through which the gas can flow readily into passage 39 whenever the valve 32 is opened. The web portion 70 of the disk is cut transversely through the middle, as indicated at 72 in Fig. 5, whereby to define two opposed radial fingers 73, the inner ends of which have abutment with the screw 74 provided on the inner end of the stem 33 of the valve 32, the fingers 73 being adapted to give the valve 32 the maximum opening movement in the snap-action of the disk, greater than what would be afforded if the web 70 were continuous. In other words, with the present construction of the disk only the annular marginal portion 75 of the disk is relied upon for the spring snap-action.

It is believed the foregoing description conveys a good understanding of the objects and advantages of my invention. The appended claims have been drawn to cover all legitimate modifications and adaptations.

I claim:

1. In a thermostatically controlled valve associated with a main burner and a pilot burner and comprising a casing, a thermostat including a threaded temperature adjustment element, a thermostatic valve in said casing for controlling flow of fuel therethrough to the main burner and operatively connected with the thermostat to be opened and closed in response to temperature change, snap-action mechanism interposed between the thermostat and said thermostatic valve to open and close the valve abruptly upon a predetermined temperature change, said casing having a bypass passage leading to the pilot burner to supply fuel thereto continuously, a safety valve adapted to shut off the flow of fuel to both burners and having an operating stem, a closing spring for said safety valve, an armature movable in a fixed relationship to said safety valve, a magnet to attract said armature having thermoelectric means for energization thereof responsive to the heat of the flame of the pilot burner, and a temperature setting lever which is swingable in a plane that includes the aforesaid stem, said lever swinging through an appreciable fraction of a turn in going from a high extreme temperature position to a low extreme temperature position and being connected to said threaded temperature adjustment element to turn it for temperature adjustment, said lever being disposed in close enough proximity to said valve stem to engage and depress the same to open the safety valve against the resistance of its closing spring when said lever is swung to the low temperature extreme position closing the thermostatic valve.

2. In a fuel valve structure for controlling the flow of fuel to a main burner and a cooperating pilot burner, a casing having therein a fuel inlet passage in which is included a seat for a safety valve, a safety valve arranged to engage said seat and having spring means normally tending to close it and an armature for holding it open arranged to be attracted by a thermo-electrically energizable magnet operated in response to heat in the operation of the pilot burner, said casing having an outlet passage communicating with the pilot burner for delivery of fuel thereto whenever the safety valve is open, said casing also having a bore therein with which an outlet port communicates for delivery of fuel to the main burner, a temperature control valve in said casing arranged to open and close in response to temperature change, a thermostat operatively connected with said temperature control valve and having a threaded temperature adjustment element, a rod attached to and reciprocable with the safety valve and guided for movement in a direction in transverse relation to and spaced from the thermostat, and a temperature setting lever which is swingable in a plane that includes the aforesaid stem, said lever swinging through an appreciable fraction of a turn in going from a high extreme temperature position to a low extreme temperature position and being connected with said temperature adjustment element and having a lateral projection arranged to engage and depress said rod directly to move the safety valve to and hold it temporarily in open position against the resistance of the closing spring when the lever is moved to the low temperature extreme position insuring closing of the temperature control valve.

3. In a fuel valve structure for controlling the flow of fuel to a main burner and a cooperating pilot burner, a casing having therein a fuel inlet passage in which is included a seat for a safety valve, a safety valve arranged to engage said seat and having spring means normally tending to close it and an armature for holding it open arranged to be attracted by the thermo-electrically energizable magnet operated in response to heat in the operation of the pilot burner, said casing having an outlet passage communicating with the pilot burner for delivery of fuel thereto when ever the safety valve is open, said casing also having a bore therein with which an outlet port communicates for delivery of fuel to the main burner, a temperature control valve in said casing arranged to open and close in response to temperature change, a rod and tube type thermostat operatively connected with said temperature control valve and having a threaded temperature adjustment connection between the rod and tube elements, a stem attached to and reciprocable with the safety valve and guided for movement in a direction in transverse relation to and spaced from the thermostat, and a temperature setting lever connected with said rod to turn it for temperature adjustment and having a lateral projection arranged to engage said valve stem directly to move the safety valve to and hold it temporarily in open position against the resistance of the closing spring means when the lever is moved to the low temperature extreme position insuring closing of the temperature control valve, the frictional resistance to return movement of the lever afforded by said threaded connection between the rod and tube elements being enough in relation to the spring pressure on the safety valve to hold said lever against return movement when it is left standing in a position holding the safety valve open.

4. In a thermostatic temperature control valve for a gas appliance, such as a storage type water heater, comprising a valve body having a yoke extension carrying on it a threaded plug adapted for rigid connection with the appliance, a thermostat supported on said plug having a threaded temperature adjustment element, a valve in said body connected with said thermostat for operation, and a temperature setting lever connected with said thermostat temperature adjustment element to turn it and oscillatable relative to said yoke through an appreciable fraction of a turn in going from one extreme position to another extreme position, the improvement which consists in the provision of a spring pressed safety valve connected in series with said thermostatic valve to control fuel flow through said valve body independently of said thermostatic valve, the safety valve having a stem the end of which is disposed in the same plane in which the lever swings and in close enough proximity with said lever so that a lateral projection provided on said lever is arranged to engage the end of said stem to operate the safety valve directly to open position against the pressure of its spring when the lever is moved to a predetermined position.

References Cited in the file of this patent

UNITED STATES PATENTS

| | | |
|---|---|---|
| 1,744,465 | Grayson | Jan. 21, 1930 |
| 2,198,895 | Wetzel | Apr. 30, 1940 |
| 2,198,896 | Wetzel | Apr. 30, 1940 |
| 2,387,164 | McCarty | Oct. 16, 1945 |
| 2,403,611 | Ray | July 9, 1946 |
| 2,650,028 | Grayson | Aug. 25, 1953 |
| 2,650,766 | Brown | Sept. 1, 1953 |